United States Patent Office 3,507,620
Patented Apr. 21, 1970

3,507,620
METHOD FOR TRACING THE FLOW OF WATER IN SUBTERRANEAN FORMATIONS
John A. Gurney, Tarrytown, N.Y., assignor to Union Oil Company of California, Los Angeles, Calif., a corporation of California
No Drawing. Filed Oct. 3, 1967, Ser. No. 672,447
Int. Cl. E21b *47/10;* G01n *31/22, 33/24*
U.S. Cl. 23—230
13 Claims

ABSTRACT OF THE DISCLOSURE

A method for tracing the flow of water through a subterranean formation in which a water-soluble salicylate is added to the water at a selected point and samples of water are withdrawn from the formation at one or more points remote from the point of addition and analyzed for the presence of salicylate.

---

This invention relates to the study of water flow and more particularly is concerned with a method for tracing the flow of water in subterranean formations.

It is often desired to ascertain the flow pattern of water through porous subterranean formations, such as petroleum reservoirs. Methods for tracing the flow of water in subterranean areas are useful in the oil well treating field and are especially useful in tracing the flow of an aqueous flooding medium through an oil-bearing formation as from an input to an output well. Accordingly, it has been suggested that various agents be added to the water at an injection point and that a sample of the water withdrawn at a remote point be analyzed for the presence of the tracer material to indicate the passage of the water from the injection point to the recovery point.

In order that a material be useful as a chemical tracer in the study of the flow of subterranean water, the tracer must be stable, and relatively unabsorbed and unreactive in the presence of formation water, oil and rock. Further, the tracer must be easily identified at low concentrations in the produced waters, preferably by simple color tests. It is also desirable that the tracer be relatively inexpensive and easy to handle, and possess such properties as high water solubility and low toxicity. While several materials have been proposed which are generally useful as tracers, it frequently becomes necessary in the study of complex flow systems to inject a number of different tracer agents at different injection points and to analyze water withdrawn at one or more recovery points for the presence of these tracers. Also, one or more of the known tracer materials may not be useful in a particular formation because of interference by natural or injected constituents in the formation. Thus, there exists a demand for a number of chemical materials suitable as tracers.

Accordingly, a principal object of the present invention is to provide a method for tracing the flow of water employing a distinctive chemical tracer. Another object is to provide a method for studying the flow of aqueous media through a subterranean petroleum reservoir from an injection well to a recovery well. Other objects and advantages of the invention will be obvious to those skilled in the art from the following more detailed description.

In accordance with the method of the present invention for tracing the flow of water in subterranean formations, a water-soluble salicylate is aded to the water at an origin point and portions of the water obtained at a recovery point analyzed for salicylate as an indication of derivation or flow from the origin point.

Water-soluble salicylates useful in the practice of this invention include the ammonium and alkali metal salts of salicylic acid. Of these, the ammonium, sodium and potassium salts of salicylic acid are preferred. Thus, the preferred salicylates include ammonium salicylate, sodium salicylate and potassium salicylate. Sodium salicylate is particularly preferred as a tracer in the practice of this invention.

The preferred salicylates can be prepared by reacting salicylic acid with aqueous ammonium hydroxide or alkali metal hydroxides, such as sodium and potassium hydroxide. Salicylic acid readily reacts with ammonium and alkali metal hydroxides at ambient conditions. Preferably, the salicylate is prepared by admixing salicylic acid with an excess of a relatively dilute solution of ammonium or alkali metal hydroxide, i.e. an aqueous hydroxide solution having a hydroxide concentration of less than about 10 weight percent. The salicylic acid substantially completely reacts with the hydroxide to form the ammonium or alkali metal salicylate, the product being obtained as an aqueous solution amenable to injection into the formation.

The water-soluble salicylate is employed in amounts sufficient to enable detection at the recovery point after dilution with formation water. Accordingly, it is preferred that sufficient salicylate be added at the origin to produce a concentration of at least 10 p.p.m. at the recovery point. Although generally the salicylate can be added up to its limit of solubility, usually more dilute concentrations are preferred. In one mode of practicing the invention, salicylate is added in an amount sufficient to obtain a concentration of about 25 p.p.m. to 200 p.p.m. at the origin point. In another mode of practicing the invention, a slug of relatively concentrated aqueous salicylate solution, such as produced by the aforementioned technique, is injected at an origin point, such as a water injection well communicating with a subterranean formation. The salicylate solution is displaced through the formation with an aqueous flooding medium. Water samples are withdrawn from the formation at one or more recovery wells spaced apart from the injection well and analyzed for the presence of salicylate to indicate the derivation of water from the input well.

The analysis for the presence of salicylate in water obtained at the recovery point can be accomplished by adding an acidic solution containing ferric ions, e.g. ferric chloride, ferric sulfate and ferric nitrate solutions. If salicylate is present, indicating flow of water from the origin point, a violet to purple color is produced. If the salicylate is not present, indicating a flow of water from a source other than the origin point, a light yellow or yellow-green color is produced on addition of the ferric ions. A colormetric photoelectric cell can be used to detect colors particularly if the salicylate ions are present in the water in an amount less than 10 p.p.m. For most field operations, it is however preferred to inject a sufficient quantity of salicylate to provide water at the recovery point with a salicylate content of 10 p.p.m. or more to enable detection by visual means.

EXAMPLE I

An aqueous sodium salicylate solution is prepared by reacting about 100 pounds of salicylic acid with 730 pounds of 4 weight percent aqueous sodium hydroxide. Approximately 100 gallons of this solution is injected into a water injection well and followed with flood water. Small samples of water produced from a spaced output well are periodically recovered and analyzed for sodium salicylate. The analysis is performed by adding about 5 drops of acidic ferric chloride to 5 ml. of produced water in a small vial and the contents of the vial shaken. The color of the water is observed to detect the presence of sodium salicylate. The result obtained on analysis of a series of samples of recovered water is as follows:

| Sample: | Color of water |
|---|---|
| 1 | Yellow-green. |
| 2 | Do. |
| 3 | Purple. |

The above data indicates that sodium salicylate is present in sample number 3 and that the water injected into the input well had traversed the formation and reached the output well.

While one application of the invention has been described it will be apparent that the invention can be employed in other applications, such as for instance tracing the possible contamination of water in water wells and determining the rate of flow of liquid from one well to another. Further, various modifications and changes can be made in the practice of the invention without departing from the spirit thereof.

Having now described the invention, I claim:

1. A method for tracing the flow of water which comprises adding a water-soluble salt of salicylic acid to the water at an origin point, recovering a sample of water at a recovery point, and analyzing the sample for the salicylic acid salt as an indication of water derivation from the origin point.

2. The method defined in claim 1 wherein the water-soluble salt of salicylic acid is selected from the group consisting of ammonium and alkali metal salicylates.

3. The method defined in claim 1 wherein the water-soluble salt of salicylic acid is selected from the group consisting of ammonium salicylate, sodium salicylate and potassium salicylate.

4. The method defined in claim 1 wherein, the water-soluble salt of salicylic acid is sodium salicylate.

5. The method defined in claim 1 wherein the sample of recovered water is analyzed by adding an acidic solution containing ferric ions to a portion of the water sample admixed with carbon tetrachloride to produce an identifying color.

6. The method defined in claim 1 wherein sufficient of said water-soluble salt of salicylic acid is added at the origin point to produce a detectable concentration at a recovery point.

7. A method for tracing the flow of an aqueous media through a subterranean petroleum reservoir from an input well to an output well, which comprises:
adding a water-soluble salicylate to the aqueous media at the input well;
recovering a sample of water at the output well; and
analyzing the recovered water for salicylate as an indication of water derivation from the input well.

8. The method defined in claim 7 wherein a slug of aqueous salicylate solution is injected into the input well and followed by the injection of aqueous media.

9. The method defined in claim 8 wherein the aqueous salicylate solution is prepared by reacting salicylic acid with aqueous ammonium or alkali metal hydroxide.

10. The method defined in claim 7 wherein the presence of salicylate in the sample of recovered water is detected by adding acidic ferric chloride to produce an identifying color.

11. The method defined in claim 7 wherein sufficient of said salicylate is added to the water at the input well to provide a concentration of salicylate at the output well of at least about 10 p.p.m.

12. A method for tracing the flow of aqueous flooding medium through a petroleum reservoir from an input well to an output well, which comprises:
preparing an aqueous solution of sodium salicylate by reacting salicylic acid with aqueous sodium hydroxide;
injecting the sodium salicylate solution into the input well in sufficient quantity to produce a detectable concentration at the output well;
thereafter injecting aqueous flooding medium into said input well;
obtaining a sample of recovered water from a spaced output well; and
analyzing the sample of recovered water for salicylate as an indication of water derivation from the input well.

13. The method of claim 12 wherein the recovered water is analyzed for sodium salicylate by adding acidic ferric chloride to produce an identifying color in the water phase.

References Cited

UNITED STATES PATENTS

| 2,553,900 | 5/1951 | Doan et al. |
| 3,003,856 | 10/1961 | Boyd. |

FOREIGN PATENTS

| 691,812 | 8/1964 | Canada. |

MORRIS O. WOLK, Primary Examiner

R. M. REESE, Assistant Examiner

U.S. Cl. X.R.

166—252